(12) United States Patent
Kato et al.

(10) Patent No.: US 7,697,047 B2
(45) Date of Patent: Apr. 13, 2010

(54) IMAGE SENSOR, READING DEVICE AND METHOD FOR SETTING RESOLUTION

(75) Inventors: Tetsuya Kato, Chiryu (JP); Hideaki Nagasaka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1128 days.

(21) Appl. No.: 10/831,306

(22) Filed: Apr. 26, 2004

(65) Prior Publication Data

US 2004/0263922 A1    Dec. 30, 2004

(30) Foreign Application Priority Data

Apr. 28, 2003    (JP)    ............................. 2003-123860

(51) Int. Cl.
*H04N 3/15* (2006.01)
*H04N 5/335* (2006.01)
*H04N 1/12* (2006.01)

(52) U.S. Cl. ........................ 348/294; 358/482; 358/494

(58) Field of Classification Search ................. 348/294, 348/302, 308; 358/471, 474, 482, 494
See application file for complete search history.

(56) References Cited

U.S. PATENT DOCUMENTS

| 5,428,459 | A | * | 6/1995 | Asai | ............................ | 358/449 |
| 6,249,618 | B1 | * | 6/2001 | Hou | ............................ | 382/312 |
| 2002/0135827 | A1 | * | 9/2002 | Saika | .......................... | 358/474 |
| 2004/0190083 | A1 | * | 9/2004 | Ikeno et al. | .................. | 358/474 |
| 2004/0190087 | A1 | * | 9/2004 | Ikeno et al. | .................. | 358/482 |
| 2004/0212844 | A1 | * | 10/2004 | Kato | ........................... | 358/448 |
| 2004/0212845 | A1 | * | 10/2004 | Kato | ........................... | 358/448 |

FOREIGN PATENT DOCUMENTS

| JP | A 5-227362 | 9/1993 |
| JP | A 2000-101803 | 4/2000 |
| JP | A 2002-185698 | 6/2002 |

* cited by examiner

*Primary Examiner*—Jason Whipkey
(74) *Attorney, Agent, or Firm*—Oliff & Berridge, PLC

(57) ABSTRACT

An image sensor, a reading device and a method for setting a resolution are provided for setting the resolution to multiple levels without increasing signal types. The image sensor comprises plural photoelectric converting elements for converting optical signals to electric signals; a group of channel select switches, each channel select switch arranged between a charge output unit of each channel select switch and a signal line corresponding to each photoelectric converting element, wherein the group of the channel select switches can be turned on and off sequentially synchronizing with an externally supplied clock pulse signal; and resolution setting means, wherein when a resolution assignment signal, a resolution assignment timing signal and a resolution assignment period setting signal are input, the resolution setting means sets an on-off control pattern for the group of the channel select switches according to an on-off pattern of the resolution assignment signal at a plurality of timings set by the resolution assignment timing signal in a resolution assignment period set according the resolution assignment setting signal.

21 Claims, 14 Drawing Sheets

IMAGE SENSOR, READING DEVICE AND METHOD FOR SETTING RESOLUTION

CROSS-REFERENCE TO RELATED APPLICATION

This application claims the priority benefit of Japanese application serial no. 2003-123860, filed on Apr. 28, 2003.

BACKGROUND OF THE INVENTION

1. Field of the Invention

The present invention relates in general to an image sensor, a reading device and a method for setting a resolution. In particular, the present invention relates to an image sensor, a reading device with the image sensor and a method for setting a resolution of the image sensor, wherein the image sensor comprises a plurality of photoelectric converting elements for converting light signals into electric signals, and a group of channel select switches capable of being sequentially turned on and off to control a connection between a charge output unit of the photoelectric converting element and a common signal line.

2. Description of Related Art

Image sensors are used in a reading device, such as a facsimile, a copy machine and a hand scanner, etc. FIG. 14 shows a structure of a conventional image sensor. Referring to FIG. 14, photoelectric converting elements P1a~P1e are phototransistors, etc. for detecting light to output electric currents (image signals). P2 is a power input terminal for inputting a power voltage VDD. P3a~P3e are channel select switches respectively connected to charge output units of the photoelectric converting elements P1a~P1e. P4 is a shift register group, wherein the shift register group P4 is activated by a start signal, image signals output from the photoelectric converting elements P1a~P1e are sequentially output from an image signal output terminal P11 through a common signal line P7, and each channel select switch P3a~P3e can be sequentially turned on and off according to the period of a clock pulse signal. P4a~P4f are shift registers. P5 is a start signal input terminal for inputting the start signal (SI). P6 is a clock pulse signal input terminal for inputting the clock pulse signal (CLK).

After activated by the start signal SI, a flip-flop P8 continuously outputs an "ON" signal during an operation period of the shift register group P4, a period starting from inputting a start signal SI to the shift register P4a until the start signal SI is output from the shift register P4f. A chip select switch P9 is inserted onto a signal line P7, so that the chip select switch P9 is turned off upon receiving the "ON" signal from the flip-flop P8. A switch P10 is connected between the signal line P7 and a ground terminal P12 to repeatedly open and close according to a level change of the clock pulse signal CLK.

Next, the operation of the conventional image sensor is described. The start signal SI and the clock pulse signal are externally provided to the shift register group P4 through the start signal terminal P5 and the clock pulse signal input terminal P6, respectively. The period of start signal SI is twice of the period of the clock pulse signal CLK, and is read by the shift register P4a of the shift register group P4 at the falling edge of the clock pulse signal CLK.

The shift register P4a is activated by reading the start signal SI, and then the shift register P4a closes the channel select switch P3a for a time interval of one period of the clock pulse signal CLK. In this way, the image signal output from the photoelectric converting element P1a is output from the image signal output terminal P11 through the signal line P7.

Then, the channel select switch P3a returns to its open status and the read start signal SI is transmitted to the shift register P4b.

Therefore, since the start signal SI is read by a shift register sequence of P4b→P4c→P4d→P4e, the image signals of the photoelectric converting elements P1b to P1e are sequentially output from the image signal output terminal P11. In addition, the output of the shift register P4f is transmitted through the terminal P13 to serve as a start signal for the next-stage sensor IC.

In the aforementioned image sensor, the control signal externally input is used to selectively switch and output the current, which is output from the photoelectric converting element to the image signal output terminal, by determining whether the control signal is a high level (H) or a low level (L), and the resolution for reading is set to two levels. Refer to Japanese Laid Open Publication H05-227362.

However, in the above method for setting the resolution, the resolution can be only set to two levels, a resolution corresponding to when the control signal is "H" and a resolution corresponding to when the control signal is "L". In contrast, most of general reading devices have to set the resolution to multi-levels, exceeding two levels. If control signals with plural types, such as two types, three types, four types, . . . etc., can be input, the resolution can be set to multi-levels, such as four levels, eight levels, sixteen levels, . . . etc. However, in this case, it needs a lot of additional signal lines, and thereby substantially increasing the cost.

SUMMARY OF THE INVENTION

According to the foregoing description, an object of this invention is to provide an image sensor, a reading device and a method for setting a resolution, capable of setting the resolution to multiple levels without increasing signal types.

In accordance with the object mentioned above, the present invention provides an image sensor comprising a plurality of photoelectric converting elements for converting optical signals to electric signals; a group of channel select switches, each channel select switch arranged between a charge output unit of each channel select switch and a signal line corresponding to each photoelectric converting element, wherein the group of the channel select switches can be sequentially turned on and off synchronizing with an externally supplied clock pulse signal; and resolution setting means, wherein when a resolution assignment signal, a resolution assignment timing signal and a resolution assignment period setting signal are input, the resolution setting means sets an on-off control pattern for the group of the channel select switches according to an on-off pattern of the resolution assignment signal at a plurality of timings set by the resolution assignment timing signal in a resolution assignment period set by the resolution assignment setting signal.

In the aforementioned image sensor, the group of channel select switches arranged corresponding to the respective photoelectric converting elements can be sequentially turned on and off synchronizing with the externally supplied clock pulse signal. Therefore, the charge output unit of each photoelectric converting element is sequentially connected to the common signal line, and the image signal can be output through the common signal line.

In addition, when the resolution assignment signal, the resolution assignment timing signal and the resolution assignment period setting signal are input, the resolution setting means sets the on-off control pattern of the channel select switch group in the following manner, and the resolution is set by the setting of the on-off control pattern. In other words, in the resolution assignment period set according to the resolution assignment period setting signal, the on-off control pattern of the channel select switch group is set according to the on-off pattern of the resolution assignment signal at the timings set by the resolution assignment timing signal. The on-off pattern of the resolution assignment signal in the resolution assignment period can have many variations. Since each pattern corresponds to one resolution, the resolution can be set to multi-levels without increasing signal types.

In the aforementioned image sensor, the resolution assignment period can be set as a prescribed period after the resolution assignment period setting signal is turned off. Since the resolution assignment period can be set as a prescribed period after the resolution assignment period setting signal is turned off, the operation of the resolution setting means can be initialized when the resolution assignment period setting signal is turned off. Therefore, the control is simplified, and the resolution setting can be more precise.

The above image sensor can further comprise a group of shift registers for determining the on-off control pattern for the group of the channel select switches. The group of the shift registers determines the on-off control pattern according to the resolution set by resolution setting means.

The above image sensor further comprises a group of shift registers for determining the on-off control pattern of the group of the channel select switches. The on-off control pattern is determined according to the resolution set by the resolution setting means. Therefore, the required signal types can be further reduced by using the clock pulse signal, etc described below.

In the above image sensor, the on-off pattern of the resolution assignment signal at the plurality of timings set by the resolution assignment timing signal is set as binary data, and the setting of the resolution by the resolution setting means is performed by binary data or the number of "on" status in the on-off pattern.

Accordingly, levels of settable resolutions can be easily increased by increasing the number of timings. Therefore, in the above image sensor, the settable resolutions levels can be easily increased without increasing the signal types.

In the above image sensor, the resolution assignment signal, the resolution assignment timing signal and the resolution assignment period setting signal can respectively correspond to a control signal, a start signal for activating the group of the shift registers and the clock pulse signal which are respectively input from an external device.

Namely, the aforementioned control can be implemented by adding the control signal to the start signal and the clock pulse signal both of which are indispensable to the control of the shift register group. Therefore, the required signal types can be further decreased and thus the cost can be effectively reduced.

In addition, when the start signal is the resolution assignment period setting signal, an on-off control of the group of the shift registers is started after the resolution assignment period. When the start signal is used as the resolution assignment setting signal, the start signal can be turned on once before the resolution assignment period. In the above image sensor, the start signal used as the resolution assignment period setting signal is directly used as a start signal for the shift register group to start the on-off control of the shift register group after the resolution assignment period. Therefore, the start signal for the shift register needs not be turned on again, and thus the process can be further simplified and accelerated.

Furthermore, the resolution assignment timing signal can be the clock pulse signal. Since the clock pulse is used as the resolution assignment timing signal, the on-off pattern of the resolution assignment timing signal can be read synchronizing with the clock pulse signal. Therefore, the control can be simplified.

The resolution assignment period is randomly determined by a software setting. Therefore, the period can be randomly extended or shorten according to the resolution types (number), and it is not necessary to waste time to wait until the end of the period to output the image signal, so that time can be effectively utilized.

When a resolution other than a maximum resolution is set by resolution setting means, the group of the shift registers simultaneously turns on the plural channel select switches corresponding to the set resolution.

As the resolution is decreased, the exposure period of the photoelectric elements is shortened and the charge amount output from on charge output unit is decreased. In the above image sensor, the shift register group simultaneously turns on the plural channel select switches corresponding to the set resolution. Therefore, charges are simultaneously released from a plurality of charge output units corresponding to the channel select switches that are turned on at the same time, and then the charges are output to the common signal line, so that the output of the image signal can be maintained. In addition to the aforementioned effects, the image sensor can further maintain the output of the image signal effectively.

Furthermore, in the above image sensor, when the resolution to be set is determined in the middle of the resolution assignment period, the resolution assignment period is immediately terminated. In order words, when the resolution to be set is affirmatively determined in the middle of the resolution assignment period, the resolution assignment period is immediately terminated. Therefore, the on-off control of the channel select switch group can begin at the early stage. In addition to the aforementioned advantageous features, the image sensor is also capable of outputting the image signal at the early stage.

When the resolution to be set is not the maximum resolution among settable resolutions, the resolution to be set is determined in the middle of the resolution assignment period. As long as the resolution to be set is not the maximum resolution among settable resolutions, the resolution to be set can be quickly determined in the middle of the resolution assignment period. Accordingly, that the image sensor is capable of outputting the image signal at the early stage for more resolutions.

Further, a lower resolution among the settable resolutions can be determined at an early stage of the resolution assignment period. When the resolution is set lower, the user largely hopes for a quick output of the image signal more than a lucidity of the read image. In the above image sensor, the resolution can be affirmatively determined at the early stage of the resolution assignment period, and furthermore, the output of the image signal can begin at an earlier stage. Therefore, in addition to the aforementioned advantageous features, the image sensor is capable of quickly outputting the image signal and thereby satisfying the user's demand.

In addition, the present invention provides an image sensor. The image sensor comprises a plurality of photoelectric converting elements for converting optical signals to electric signals; a group of channel select switches, each channel select switch arranged between a charge output unit of each channel select switch and a signal line corresponding to each photoelectric converting element, wherein the group of the channel select switches can be sequentially turned on and off synchronizing with an externally supplied clock pulse signal; and resolution setting means, wherein when a resolution assignment signal and a resolution assignment period setting signal are input, the resolution setting means sets an on-off control pattern for the group of the channel select switches according to an assigned timing in a resolution assignment period set according to the resolution assignment setting signal.

In the aforementioned image sensor, the group of channel select switches arranged corresponding to the respective photoelectric converting elements can be sequentially turned on and off synchronizing with the externally supplied clock pulse signal. Therefore, the charge output unit of each photoelectric converting element is sequentially connected to the common signal line, and the image signal can be output through the common signal line.

In addition, when the resolution assignment signal and the resolution assignment period setting signal are input, the resolution setting means sets the on-off control pattern of the channel select switch group in the following manner, and then the resolution is set by the setting of the on-off control pattern. In other words, the on-off control pattern of the channel select switch group is set according to the assigned timings of the resolution assignment signal in the resolution assignment period set according to the resolution assignment period setting signal. The assigned timings of the resolution assignment signal in the resolution assignment period can have many variations. Since each assigned timing corresponds to one resolution, the resolution can be set to multi-levels without increasing signal types.

The present invention further provides a reading device including the image sensor described above. The reading device comprises resolution assignment signal generating means for generating the resolution assignment signal; resolution assignment timing signal generating means for generating the resolution assignment timing signal; resolution assignment period setting means for generating the resolution assignment period setting signal; and control means for controlling the resolution assignment signal generating means, the resolution assignment timing signal and the resolution assignment period setting means according to a read resolution.

In the above reading device, the resolution assignment signal generating means, the resolution assignment timing signal and the resolution assignment period setting means are controlled by the control means. Signals generated by the three signal generating means (the resolution assignment signal, the resolution assignment timing signal and the resolution assignment setting signal) are input to the aforementioned image sensor. Therefore, in the reading device, the above three signals can be input to the image sensor according to a read resolution indicated by the control means, and the image can be read with a desired resolution through the image sensor.

Furthermore, in the above reading device, the aforementioned image sensor further comprises a group of shift registers for determining the on-off control pattern of the group of the channel select switches, and the resolution assignment signal, the resolution assignment timing signal and the resolution assignment period setting signal respectively correspond to a control signal, a start signal for activating the group of the shift register and the clock pulse signal which are respectively input from an external device.

In the above reading device, the resolution assignment signal, the resolution assignment timing signal and the resolution assignment period setting signal can respectively correspond to a control signal, a start signal for activating the group of the shit register and the clock pulse signal. By adding the control signal to the start signal and the clock pulse signal both of which are indispensable to the control of the shit register group, the aforementioned control can be implemented. Therefore, the required signal types can be further decreased and thus the cost can be effectively reduced.

Furthermore, in a resolution assignment period that is set as a prescribed period after the start signal is turned off, the control means sets a resolution by an on-off pattern of the control signal at a plurality of timings set by the clock pulse signal.

In the above reading device, the prescribed period after the start signal is turned off is used as the resolution assignment period. Namely, since the start signal is set as the resolution assignment period setting signal, the start signal can be directly used as a start signal for the shift registers. In addition, because the control signal can be input after the start signal is turned off, the control is simplified and the resolution setting can be more precise.

The timing to read the on-off pattern of the control signal is set by the clock pulse signal. Namely, since the clock pulse signal is used as the resolution assignment timing signal, the on status and off status of the resolution assignment signal can be read synchronizing with the clock pulse signal. Therefore, the process is simplified, the loading of the control system is reduced and the resolution can be set more precisely.

In addition, when a resolution other than a maximum resolution is set by resolution setting means, the group of the shift registers simultaneously turns on the plural channel select switches corresponding to the set resolution.

As the resolution is decreased, the exposure period of the photoelectric elements is shortened and the amount of charge output from on charge output unit is decreased. In the above reading device, when the resolution other than the maximum resolution is set, the shift register group simultaneously turns on the plural channel select switches corresponding to the set resolution. Therefore, charges are simultaneously released from a plurality of charge output units corresponding to the channel select switches that are turned on at the same time, and then the charges are output to the common signal line, so that the output of the image signal can be maintained. In addition to the aforementioned effects, the reading device can further maintain the output of the image signal effectively.

When a resolution is changed each time, a resolution signal for indicating the resolution is included in an image signal that is output from the image sensor. For each time changing the resolution, since the resolution signal for indicating the resolution is included in the image signal output from the image sensor, setting a wrong resolution can be detected from the exterior (for example, the control means) of the image sensor by referring to the resolution signal. Therefore, in addition to the aforementioned effects, when a wrong resolution is set to the image sensor, the reading device is capable of outputting an error message to generate and correct various signals.

The present invention further provides a method for setting a resolution of an image sensor. The image sensor comprises a plurality of photoelectric converting elements for converting optical signals to electric signals; a group of channel select switches, each channel select switch arranged between a charge output unit of each channel select switch and a common signal line corresponding to each photoelectric converting element, wherein the group of the channel select switches can be sequentially turned on and off synchronizing with an externally supplied clock pulse signal. The method is characterized in that when a resolution assignment signal, a resolution assignment timing signal and a resolution assignment period setting signal are input, an on-off control pattern for the group of the channel select switches is set according to an on-off pattern of the resolution assignment signal at a plurality of timings set by the resolution assignment timing signal in a resolution assignment period set according to the resolution assignment setting signal.

In an image sensor in which the above method can be applied, the group of channel select switches arranged corresponding to the respective photoelectric converting elements can be sequentially turned on and off synchronizing with the externally supplied clock pulse signal. Therefore, the charge output unit of each photoelectric converting element is sequentially connected to the common signal line, and the image signal can be output through the common signal line.

In the above method, when the resolution assignment signal, the resolution assignment timing signal and the resolution assignment period setting signal are input, the resolution setting means sets the on-off control pattern of the channel select switch group in the following manner, and then the resolution is set by the setting of the on-off control pattern. In other words, in the resolution assignment period set according to the resolution assignment period setting signal, the on-off control pattern of the channel select switch group is set according to the on-off pattern of the resolution assignment signal at the plural timings that are set by the resolution assignment timing signal. The on-off pattern of the resolution assignment signal in the resolution assignment period can be various and varied as desired. Since each pattern corresponds to one resolution, the resolution can be set to multi-levels without increasing signal types.

In the above method, the resolution assignment period can be set as a prescribed period after the resolution assignment period setting signal is turned off. Since the resolution assignment period can be set as a prescribed period after the resolution assignment period setting signal is turned off, reading the resolution assignment signal can start when the resolution assignment period setting is turned off. Therefore, the process can be simplified, and the resolution setting can be more precise.

In the above method, the resolution assignment signal, the resolution assignment timing signal and the resolution assignment period setting signal can respectively correspond to a control signal, a start signal for activating the group of the shift register and the clock pulse signal which are respectively input from an external device.

In the above method, the on-off states of the channel select switch group is performed by the shift register group, and the resolution assignment signal, the resolution assignment timing signal and the resolution assignment period setting signal can respectively correspond to a control signal, a start signal for activating the group of the shift registers and the clock pulse signal are respectively input from an external device. Namely, the resolution can be set by adding the control signal to the start signal and the clock pulse signal both of which are indispensable to the control of the shit register group. Therefore, the required signal types can be further decreased.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings.

DESCRIPTION OF THE EMBODIMENT

Figure 1:
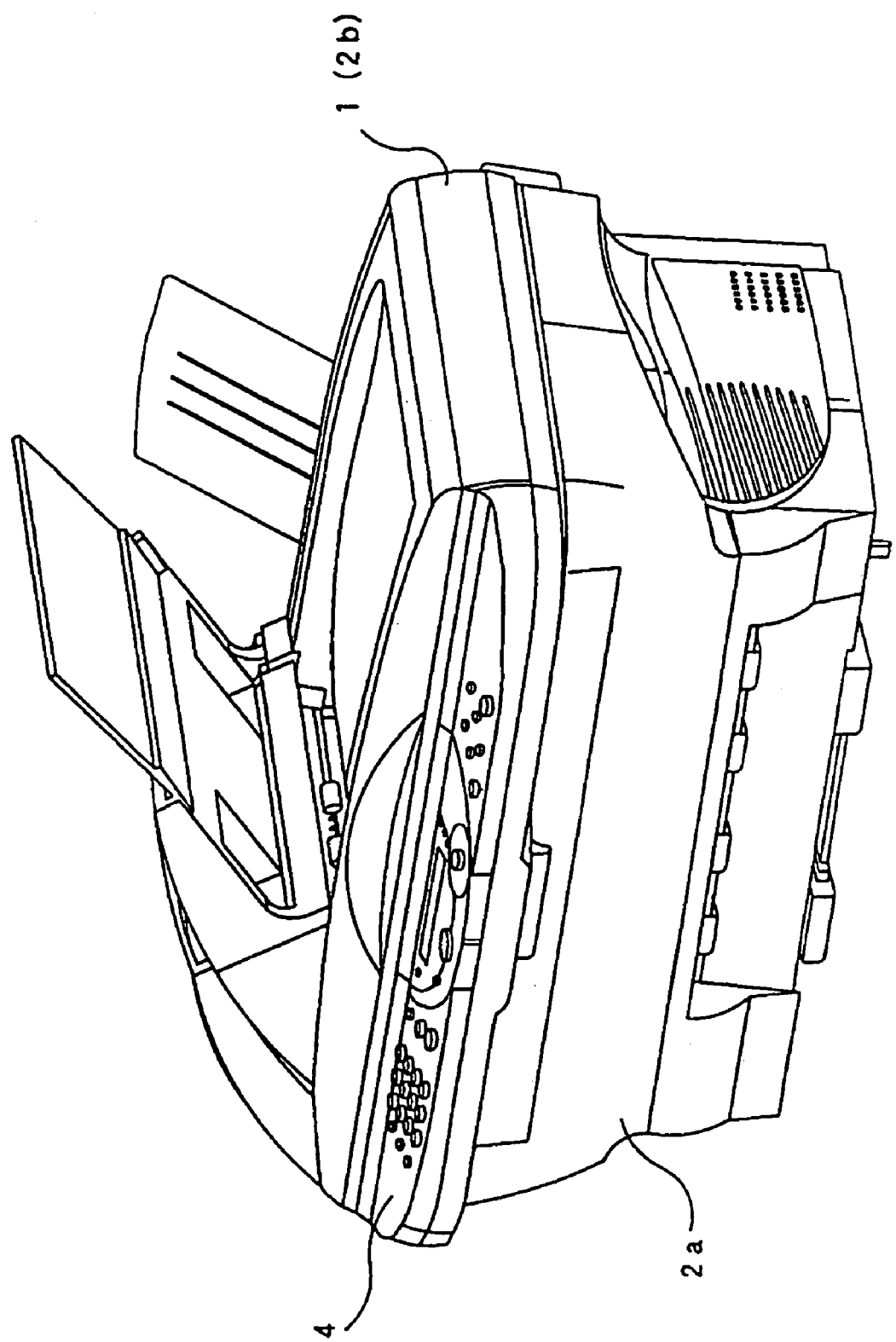
FIG. 1 shows an overall structure of a multifunction device according to a first embodiment of the invention.

The image sensor, the reading device and the method for setting the resolution according to an embodiment of the present invention will be described in detail hereinafter with reference to the accompanying drawings. FIG. 1 shows an overall structure of a multifunction machine including a reading device 1 according to the first embodiment of the present invention is described. The multifunction machine comprises an openable clam-shell mechanism where an upper body 2b is openably assembled to a lower body 2a, and the reading device 1 is included in the upper body 2b. An operation panel 4 is arranged at the front side of the upper body 2b. In addition, the multifunction machine is also equipped with an image forming device, such as a laser printer or an inject printer, etc., but its related description is omitted herein because there is no direct relationship between them.

Figure 2:
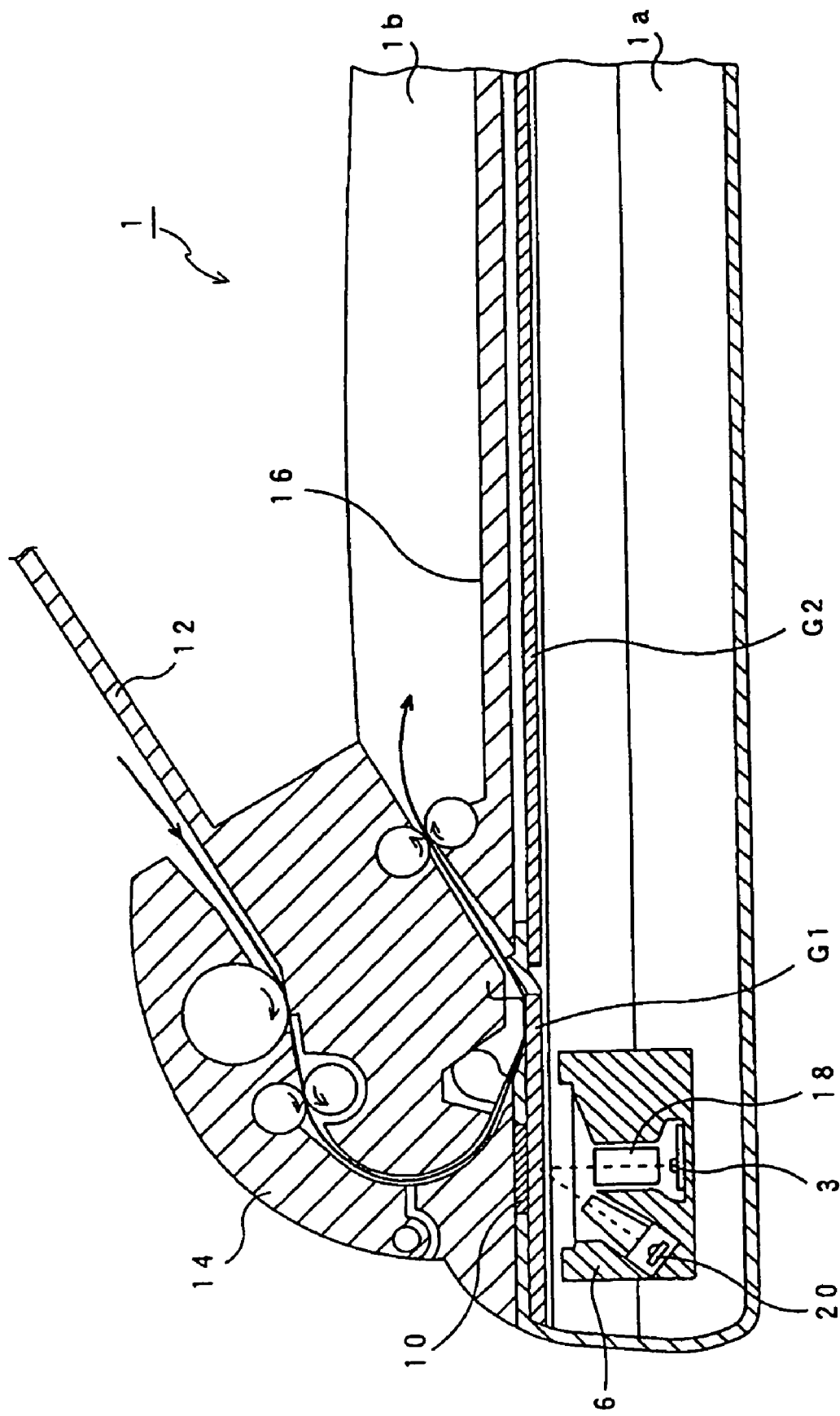
FIG. 2 shows a structure of a reading device according to a first embodiment of the invention.

As shown in FIG. 2, the reading device 1 includes a flat bed (FB) type mechanism and an auto document feed (ADF) type mechanism. The reading device 1 also comprises an openable clam-shell mechanism where a cover portion 1b is openably assembled to flat bed 1a. In the reading device 1, a reading head 6, a first platen glass G1, a second platen glass G2, a white board 10, etc. are arranged in the flat bed unit 1a. A document supply tray 12, a document transporting device 14 and a document discharging tray 16, etc. are arranged in the cover unit 1b.

The reading head 6 comprises an image device 2, a SELFOC lens 18 and a light source 20, and light from the light source 20 irradiates a document placed at a location of a reading object. The light reflected from the document is imaged on the image device 3 by the SELFOC lens 18, so that the image can be read by the image device 3. In FIG. 2, the reading head 6 is located at a standby position. When using the FB or the ADF to read the document, the reading head 6 moves to the respective reading start position.

Figure 3:
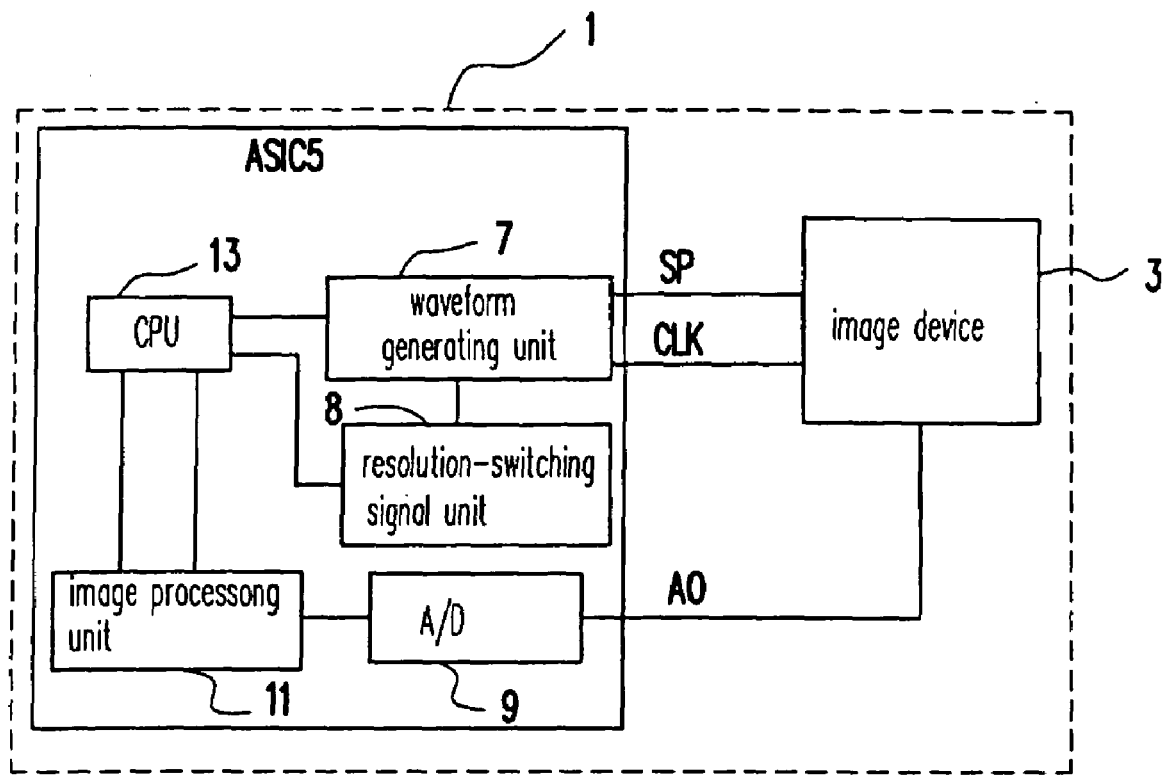
FIG. 3 chows a control system of the reading device according to a first embodiment of the invention.

FIG. 3 is a block diagram to describe the configuration of a control system of the reading device 1. Referring to FIG. 3, the reading device I comprises an image device (for example, an image sensor) 3 for reading an image, and an ASIC 5 for controlling the image device 3 and processing image signals input from the image device 3.

The structure of the image device 3 will be described later. The ASIC 5 comprises a waveform generating unit 7 (means for generating a resolution assignment timing signal, means for generating a resolution assignment period setting signal), a resolution switching signal unit (means for generating a resolution assignment signal) 8, an A/D converting unit 9, an image processing unit 11 and a central processing unit (CPU, control means) 13.

The waveform generating unit 7 is adapted for generating a start signal SP and a clock pulse signal CLK respectively that are supplied to the image device 3. The resolution switching signal unit 8 is adapted for generating a mode signal MODE (a control signal for assigning a resolution) that are supplied to the image device 3. The A/D converting unit 9 converts an analog image signal transmitted from the image device 3 into a digital signal, and then the digital signal is output to the image processing unit 11. In addition, the CPU 13 controls each unit of the ASIC 5.

Figure 4:
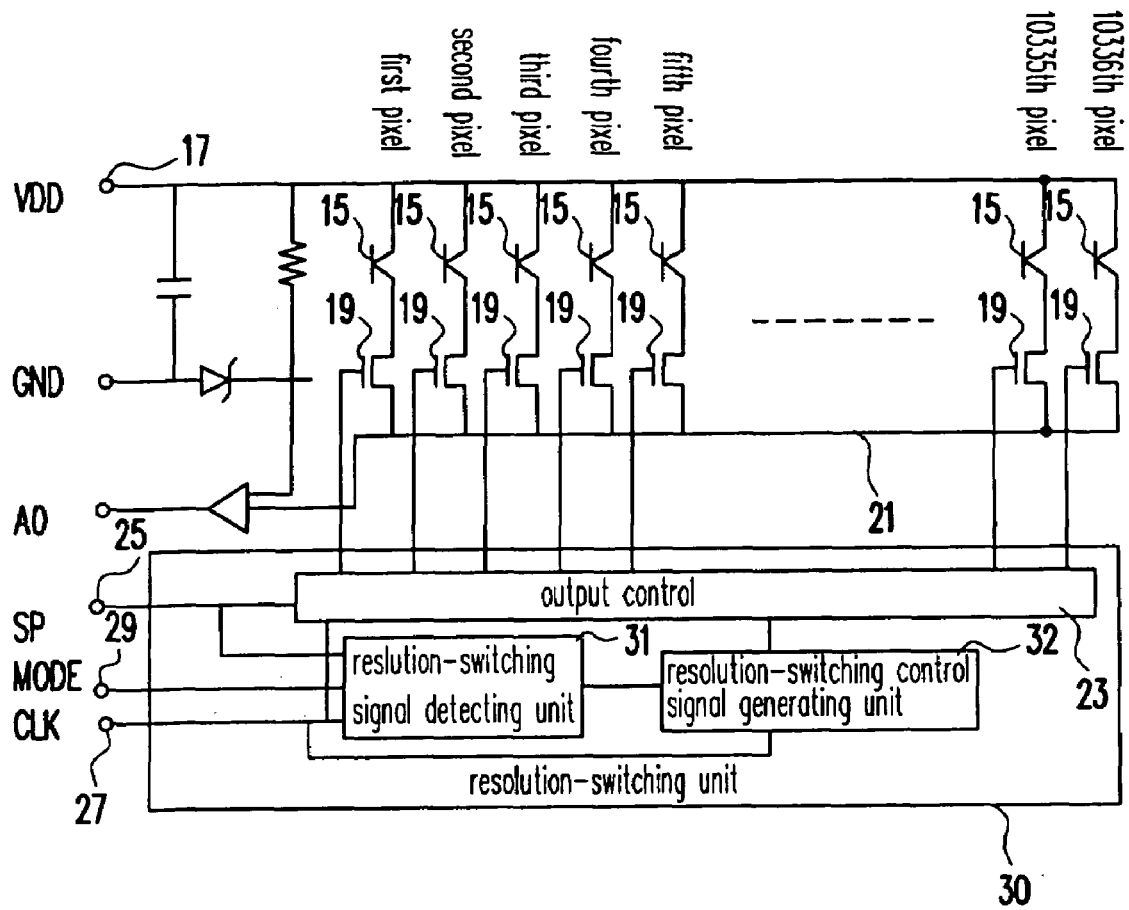
FIG. 4 shows a structure of an image device according to the first embodiment of the invention.
Figure 4:
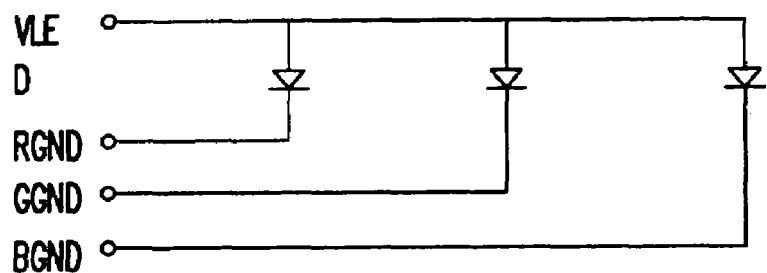

The structure and operation of the image device 3 is described in detail with reference to the accompanying drawings FIGS. 4 to 6. Referring to FIG. 4, photoelectric converting elements 15 are constructed of thin film photodiodes or photoconductive thin film, for example. The photoelectric converting elements 15 forms a density corresponding to 1200 dpi and 10336 elements 15 are arranged on one line, which are sequentially numbered form the first pixel to the 10336th pixel. Each photoelectric converting element 15 is connected to a common electrode 17 where a bias voltage VDD is applied therethrough. In FIG. 4, a capacitor for accumulating charges corresponding to each photoelectric converting element 15 is omitted.

Analog switches (channel select switches) 19 are arranged respectively corresponding to the photoelectric converting elements 15. Each analog switch 19 between an output terminal (charge output unit) of the photoelectric converting element 15 and an AO terminal 21 (common signal line serving as a signal output terminal) can be turned on and off.

An output control unit 23 is activated by the start signal SP synchronizing with the clock pulse signal CLK, and sequentially outputs a signal to the gates of the analog switches 19 so as to control the on and off states of the analog switches 19. The output control unit 23 is constructed as a shift register, and forms a resolution switching unit 30 together with a resolution-switching signal detecting unit 31 and a resolution-switching control signal generating unit 32. In the resolution switching unit 30, the on-off control patterns of the analog switches 19 can be switched to read the image with a resolution that is assigned from four resolutions of 1200 dpi, 600 dpi, 300 dpi and 150 dpi. The detail description of the structure and the operation of the output control unit 23 will be described later.

An SP terminal 25 is adapted to input the start signal SP generated by the waveform generating unit 7 of the ASIC 5 to the output control unit 23 and the resolution-switching signal detecting unit 31. A CLK terminal 27 is adapted to input the clock pulse signal CLK generated by the waveform generating unit 7 of the ASIC 5 to the resolution-switching signal detecting unit 31 and the resolution-switching control signal generating unit 32.

A MODE terminal 29 is adapted to input the mode signal MODE generated by the resolution-switching signal unit 8 of the ASIC 5 to the resolution-switching signal detecting unit 31 and the resolution-switching control signal generating unit 32. The resolution-switching signal detecting unit 31 is adapted to detect the resolution-switching signal for setting the resolution of the image device 3.

The resolution-switching control signal generating unit 32 generates a resolution-switching control signal for controlling the resolution switch according to the resolution-switching signal detected by the resolution-switching signal detecting unit 31. The resolution-switching control signal generating unit 32 outputs a signal corresponding to a resolution of any one of 1200 dpi, 600 dpi, 300 dpi and 150 dpi in the main scan direction, to the output control unit 23.

Figure 5:
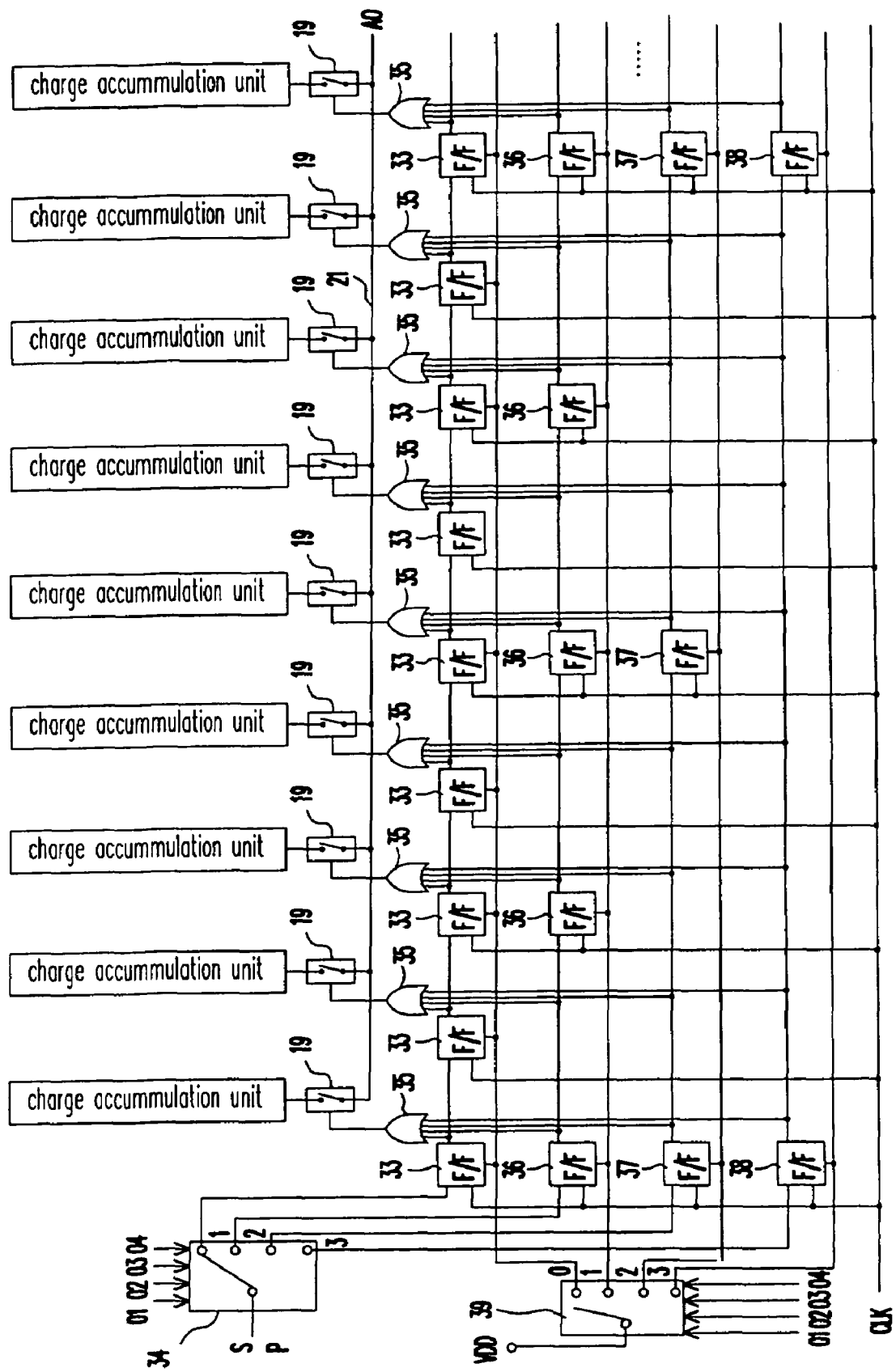
FIG. 5 shows a structure of an output control unit according to a first embodiment of the invention.

FIG. 5 is an exemplary block diagram used to describe the structure of the output control unit. Referring to FIG. 5, the flip flops (F/F) 33 are individually arranged corresponding to the respective photoelectric converting elements 15. The clock pulse signal CLK is supplied to each flip flop (F/F) 33. In addition, the start signal SP is supplied to the first flip flop 33 through a switch 34. As the start signal SP is input, the flip flops (F/F) 33 are activated in sequence, and the analog switch 19 connected though an OR gate 35 is closed for a time interval of one period of the clock pulse signal CLK. Therefore, a resolution of 1200 dpi can be implemented by the operation of the flip flops (F/F) 33.

In other words, the start signal SP input to the first flip flop (F/F) 22 is synchronized with the clock pulse signal CLK, and then sequentially transmitted to the second, the third, . . . and the 10336th flip flops (F/F) 33. Since the flip flops (F/F) 33 respectively make the corresponding analog switches to close for a time interval of one period of the clock pulse signal CLK, the photoelectric converting elements 15 sequentially from the first to the 10336th release charges to the AO terminal 21. The charges transmitted to the AO terminal 21 are transmitted to the A/D converting unit 9 of the ASIC 5, serving as an analog image signal. As the photoelectric converting elements 15 from the first to the 10336th release charges, the reading of the first line is completed. By repeating the above reading operation for a predetermined number of lines, the document is read with a resolution of 1200 dpi in the main scan direction.

Flip flops (F/F) 36 are arranged corresponding to each set consisting of two adjacent photoelectric converting elements 15, i.e., sets of the first and the second elements 15, the third and the fourth elements 15, . . . , and the 10335th and the 10336th elements 15. The same clock pulse signal CLK provided to the flip flops (F/F) 33 is also provided to each flip flop (F/F) 36. The start signal SP is supplied to the first flip flop (F/F) 36 through the switch 34. As the start signal SP is input, each flip flop (F/F) 36 is sequentially activated, and two analog switches 19 connected though the OR gates 35 are simultaneously closed for a time interval of one period of the clock pulse signal CLK. Therefore, a resolution of 600 dpi can be implemented by the operation of the flip flops (F/F) 36. Namely, from the first to the 10336th photoelectric converting elements 15, sequentially, every two adjacent photoelectric converting elements 15 release charges at the same time, i.e., the first and the second elements 15, the third and the fourth elements 15, . . . , and the 10335th and the 10336th elements 15. The charges transmitted to the AO terminal 21 are transmitted to the A/D converting unit 9 of the ASIC 5, serving as an analog image signal. As the photoelectric converting elements 15 from the first one to the 10336th one release charges, the reading of the first line is completed. By repeating the above reading operation for a predetermined number of lines, the document is read with a resolution of 600 dpi in the main scan direction.

Flip flops (F/F) 37 are arranged corresponding to each set consisting of four adjacent photoelectric converting elements 15, i.e., sets of the first to the fourth elements 15, the fifth to the eighth elements 15, . . . , and the 10333th to the 10336th elements 15. The same clock pulse signal CLK provided to the flip flops (F/F) 33, 36 is also provided to each flip flop (F/F) 37. The start signal SP is supplied to the first flip flop (F/F) 37 through the switch 34. As the start signal SP is input, each flip flop (F/F) 37 is sequentially activated, and four analog switches 19 connected though the OR gates 35 are simultaneously closed for a time interval of one period of the clock pulse signal CLK. Therefore, a resolution of 300 dpi can be implemented by the operation of the flip flops (F/F) 37. Namely, from the first to the 10336th photoelectric converting elements 15, sequentially, every four adjacent photoelectric converting elements 15 release charges to the AO terminal 21 at the same time, i.e., the first to the fourth elements 15, the fifth to the eighth elements 15, . . . and so on. The charges transmitted to the AO terminal 21 are transmitted to the A/D converting unit 9 of the ASIC 5, serving as an analog image signal. As the photoelectric converting elements 15 from the first to the 10336th release charges, the reading of the first line is completed. By repeating the above reading operation for a predetermined number of lines, the document is read with a resolution of 300 dpi in the main scan direction.

Flip flops (F/F) 38 are arranged corresponding to each set consisting of eight adjacent photoelectric converting elements 15, i.e., sets of the first to the eighth elements 15, the ninth to the sixteenth elements 15, . . . , and the 10329th to the 10336th elements 15. The same clock pulse signal CLK provided to the flip flops (F/F) 33, 36, 37 is also provided to each flip flop (F/F) 38. The start signal SP is supplied to the first flip flop (F/F) 38 through the switch 34. As the start signal SP is input, each flip flop (F/F) 38 is sequentially activated, and eight analog switches 19 connected though the OR gates 35 are simultaneously closed for a time interval of one period of the clock pulse signal CLK. Therefore, a resolution of 150 dpi can be implemented by the operation of the flip flops (F/F) 38. Namely, from the first to the 10336th photoelectric converting elements 15, sequentially, every eight adjacent photoelectric converting elements 15 release charges to the AO terminal 21 at the same time, i.e., the first to the eighth elements 15, the ninth to the sixteenth elements 15, . . . and so on. The charges transmitted to the AO terminal 21 are transmitted to the A/D converting unit 9 of the ASIC 5, serving as an analog image signal. As the photoelectric converting elements 15 from the first to the 10336th release charges, the reading of the first line is completed. By repeating the above reading operation for a predetermined number of lines, the document is read with a resolution of 150 dpi in the main scan direction.

By determining whether any one of the resolution-switching control signals Q1 to Q4 input from the resolution-switching control signal generating unit 32 is "H (high level)", the switch 34 switches to input the start signal SP to one of the flip flop (F/F) sets 33, 36, 37 and 38. In addition, a bias voltage VDD is also applied to each of the flip flops (F/F) 33, 36, 37 and 38 through a switch 39. The switch 39 also switches according to the resolution-switching control signals Q1 to Q4 so as to only apply the bias voltage VDD to one of the flip flop (F/F) sets 33, 36, 37 and 38, to which the switch 34 inputs the start signal SP. The switch 39 is to enable one of the flip flop (F/F) sets 33, 36, 37 and 38 according to the resolution-switching control signals Q1 to Q4.

Figure 6:
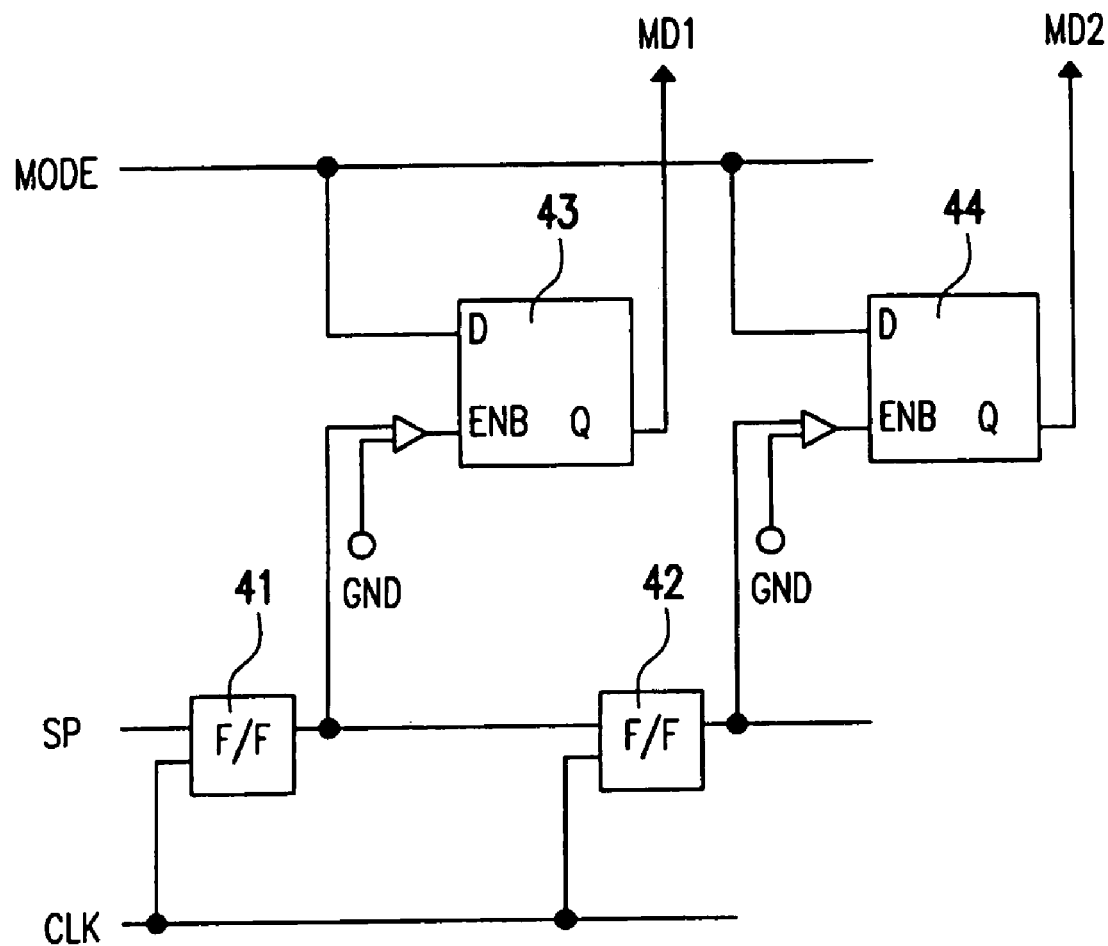
FIG. 6 shows a structure of a resolution-switching signal detecting unit according to a first embodiment of the invention.

FIG. 6 is a block diagram used to describe the structure and operation of the resolution-switching signal detecting unit 31. Referring to FIG. 6, the resolution-switching signal detecting unit 31 comprises a flip flop (F/F) 41, a flip flop (F/F) 42, a latch 43 and a latch 44. The same clock pulse signal CLK provided to the flip flops (F/F) 33, 36-38 is provided to the flip flops (F/F) 41, 42. As the start signal is input to the first flip flop (F/F) 41, the output changes synchronizing with the clock pulse signal CLK.

In addition, the latches 43, 44 are arranged corresponding to the respective flip flops (F/F) 41, 42, and latch the mode signal MODE when the corresponding flip flop (F/F) 41 or 42 performs an output operation. The mode signal MODE latched by the latches 43, 44 is input to the resolution-switching control signal generating unit 32, serving as resolution-switching signals MD1, MD2.

The resolution-switching signal generating unit 32 is constructed by a suitable combination of logic circuits and generates the resolution-switching control signals Q1 to Q4 corresponding to the resolution-switching signals MD1, MD2 according to the following TABLE 1. The resolution-switching control signals Q1 to Q4 are then input to the switches 34, 39 of the output control unit 23.

TABLE 1

| MD1 | MD2 | resolution | Q1 | Q2 | Q3 | Q4 |
| --- | --- | --- | --- | --- | --- | --- |
| H | H | 1200 dpi | H | L | L | L |
| L | H | 600 dpi | L | H | L | L |
| H | L | 300 dpi | L | L | H | L |
| L | L | 150 dpi | L | L | L | H |

H: high level,
L: low level

When the resolution-switching control signal Q1 is "H" and the other resolution-switching control signals Q2 to Q4 are "L", the switches 34, 39 of the output control unit 32 switch to the terminal "0" as shown in FIG. 5. Then, the image is read with a resolution of 1200 dpi by using the flip flops (F/F) 33. Similar to other cases, when only the resolution-switching control signal Q2 is "H" and the others are "L", the switches 34, 39 of the output control unit 32 switch to the terminal "1" and a resolution of 600 dpi can be implemented by the flip flops (F/F) 36. When only the resolution-switching control signal Q3 is "H" and the others are "L", the switches 34, 39 of the output control unit 32 switch to the terminal "2" and a resolution of 300 dpi can be implemented by the flip flops (F/F) 37. When only the resolution-switching control signal Q4 is "H" and the others are "L", the switches 34, 39 of the output control unit 32 switch to the terminal "3" and a resolution of 150 dpi can be implemented by the flip flops (F/F) 38. In addition, the start signal SP is latched at the switch 37 until any one on the terminal "0" to "3" is switched to.

Figure 7:
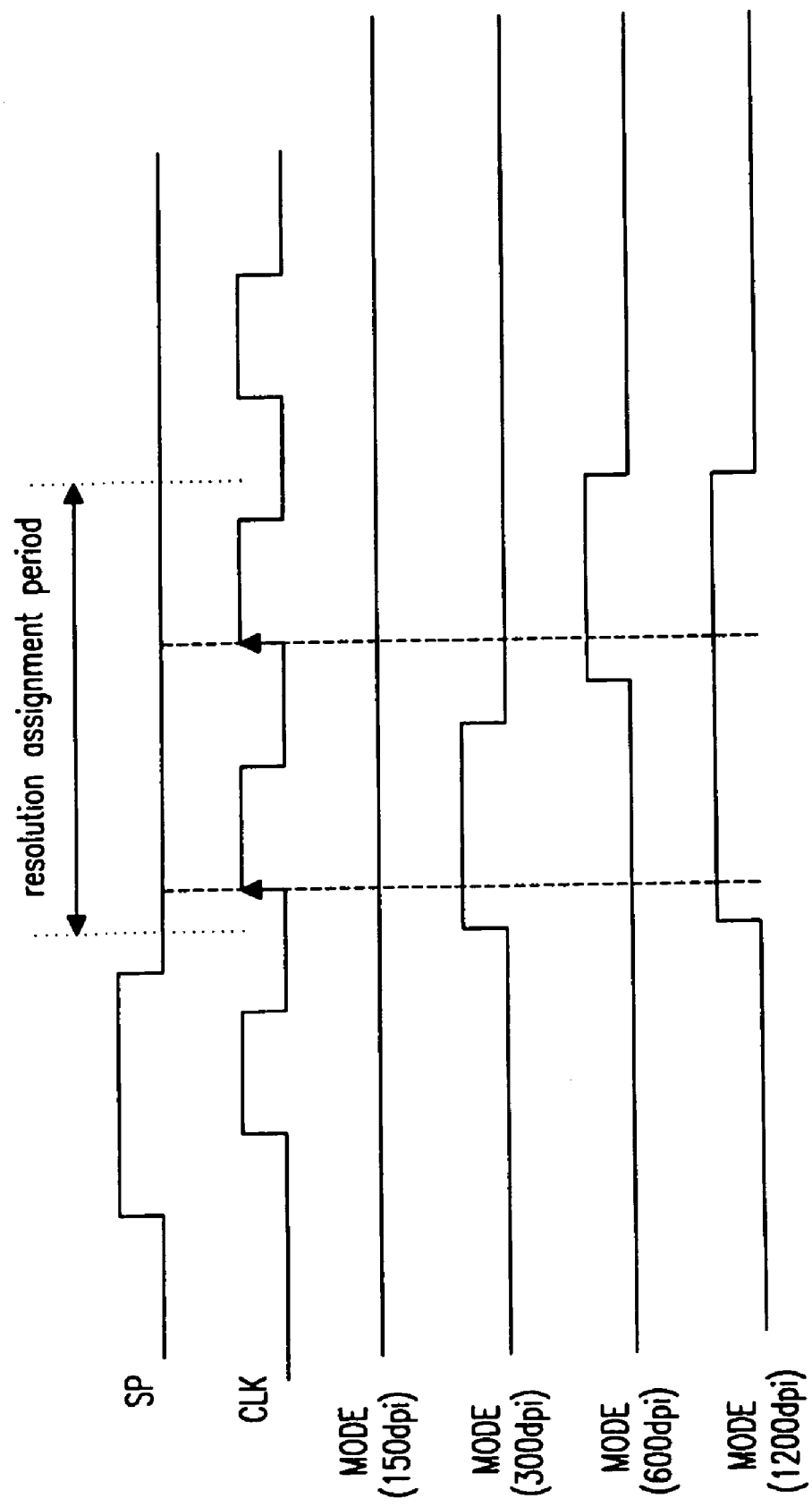
FIG. 7 is a timing diagram showing the resolution setting according to a first embodiment of the invention.

In the embodiment of the above structure, the resolution switch can be performed in the following manner. As shown in a timing diagram in FIG. 7, an interval of two periods of the clock pulse signal CLK from the falling of the start signal SP is set as a mode switching period (a resolution assignment period). This mode switching period can be randomly set by a software. When the mode signals MODE (MD1, MD2), latched synchronizing with the rising edge of the clock pulse signal CLK in the mode switching period, are "L", "L" respectively, a resolution of 150 dpi can be assigned. Similarly, a resolution of 300 dpi, 600 dpi or 1200 dpi can be respectively assigned when the mode signals MODE (MD1, MD2) are "H, L", "L, H", or "H, H". Based on the resolution instructed by operation of the operation panel 4 from a user, the CPU 13 controls the resolution-switching signal unit 8 to generate a suitable mode signal MODE as shown in FIG. 7 to supply to the image device 3.

As described above, in the embodiment, the resolution can be set to four levels according to three signals, the start signal SP, the clock pulse signal CLK and the mode signal MODE. Therefore, the number of the signal lines in the reading device 1 is not increased and thereby reduce the cost. Furthermore, in the present embodiment, since a predetermined period after the start signal SP falls is used as the mode switching period (the resolution assignment period), the start signal SP itself can be directly used as a start signal for the output control unit 23, so that the process can be further simplified. In addition, since the resolution-switching signals MD1, MD2 are detected after the start signal SP falls, the resolution setting can be also actually performed.

In addition, the resolution-switching signals MD1, MD2 can be detected as binary two-digit data. Further, if the number of the flip flops (F/F) and latches of the resolution-switching signal detecting unit 31 is increased, by extending the mode switching period (the resolution assignment period) up to three or more periods of the clock pulse signal CLK, various resolutions can be set without increasing signals provided to the image device 3.

Figure 8:
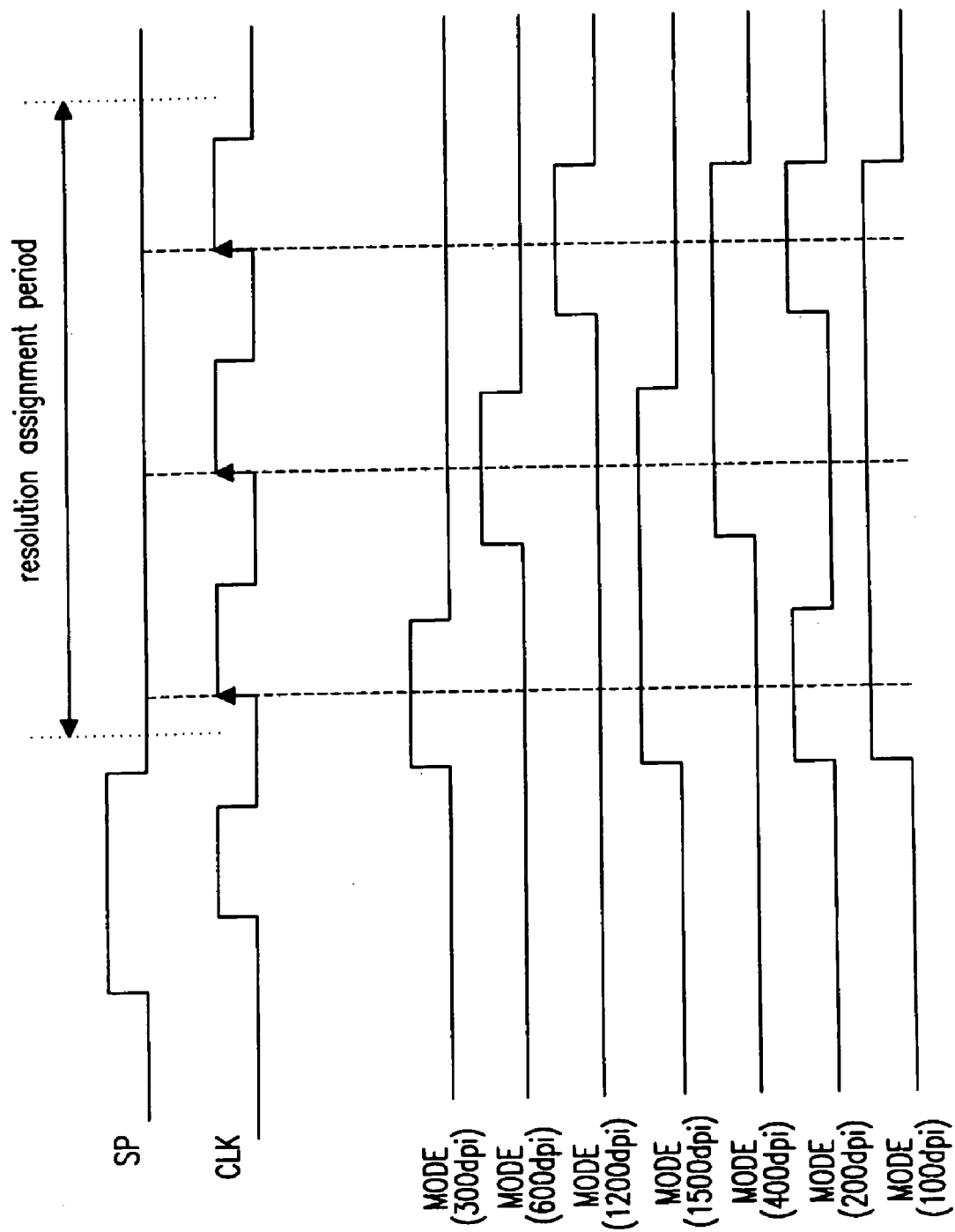
FIG. 8 is a timing diagram showing the resolution setting according to a second embodiment of the invention.

For example, in the second embodiment shown in FIG. 8, when the mode signals MODE latched synchronizing with the rising edge of the clock pulse signal CLK in the mode switching period are "H", "L", "L" respectively, a resolution of 300 dpi can be assigned. Similarly, a resolution of 600 dpi, 1200 dpi, 150 dpi, 400 dpi, 200 dpi or 100 dpi can be respectively assigned when the mode signals MODE are "L, H, L", "L, L, H", "H, H, L", "L, H, H, "H, L, H", or "H, H, H". Further, in the second embodiment, when the first and the second latched mode signals MODE are "L", "L", a resolution of 1200 dpi can be immediately determined without waiting the third mode signal MODE (H).

In order to implement resolutions of 400 dpi, 200 dpi, etc., it is necessary to add flip flops (F/F) or other switches to be able to close the analog switches 19 for every three or six switches. Since this structure can be easily modified according to FIG. 5, and therefore a detailed description thereof is omitted herein.

Figure 9:
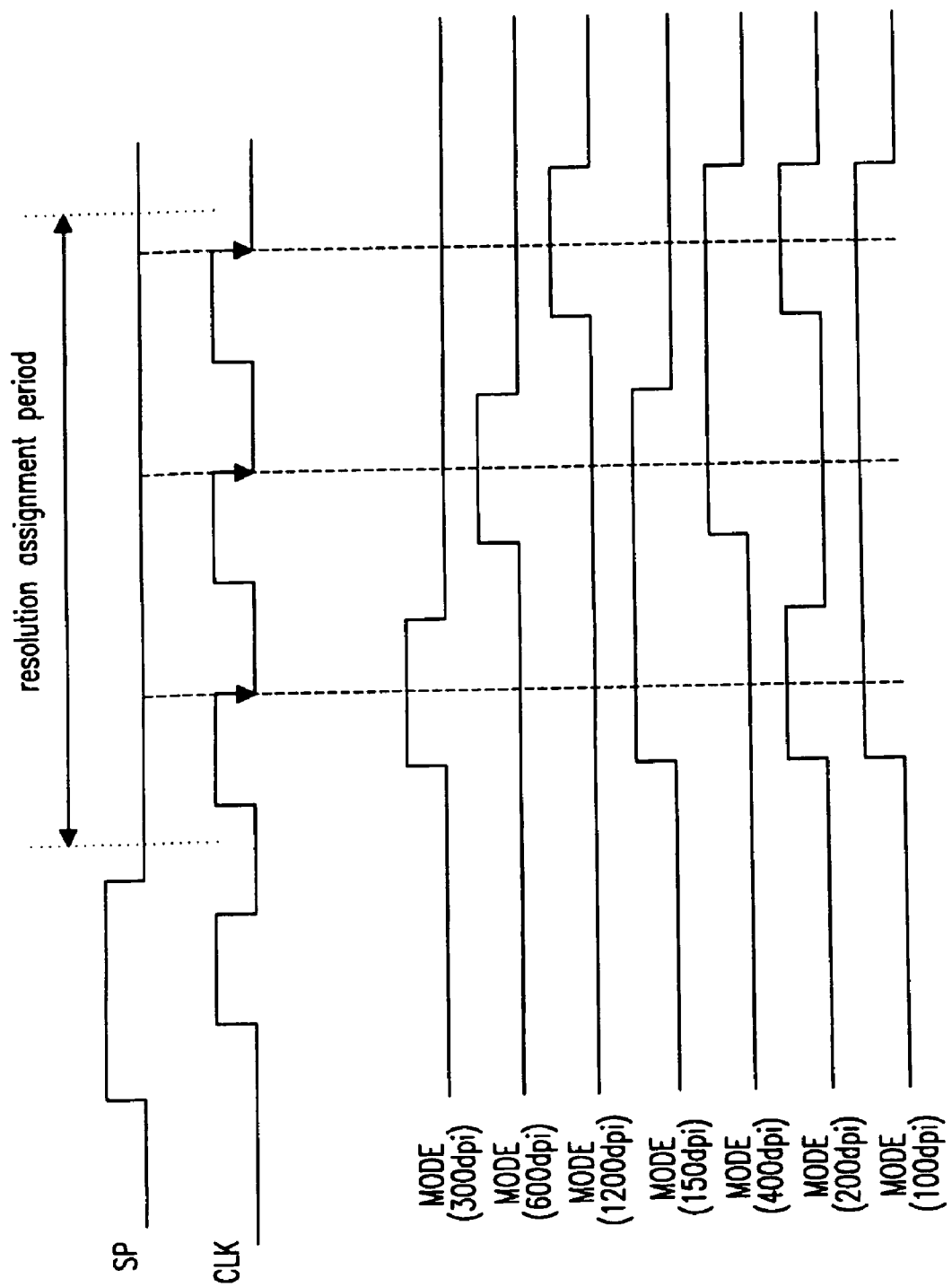
FIG. 9 is a timing diagram showing the resolution setting according to a third embodiment of the invention.
Figure 10:
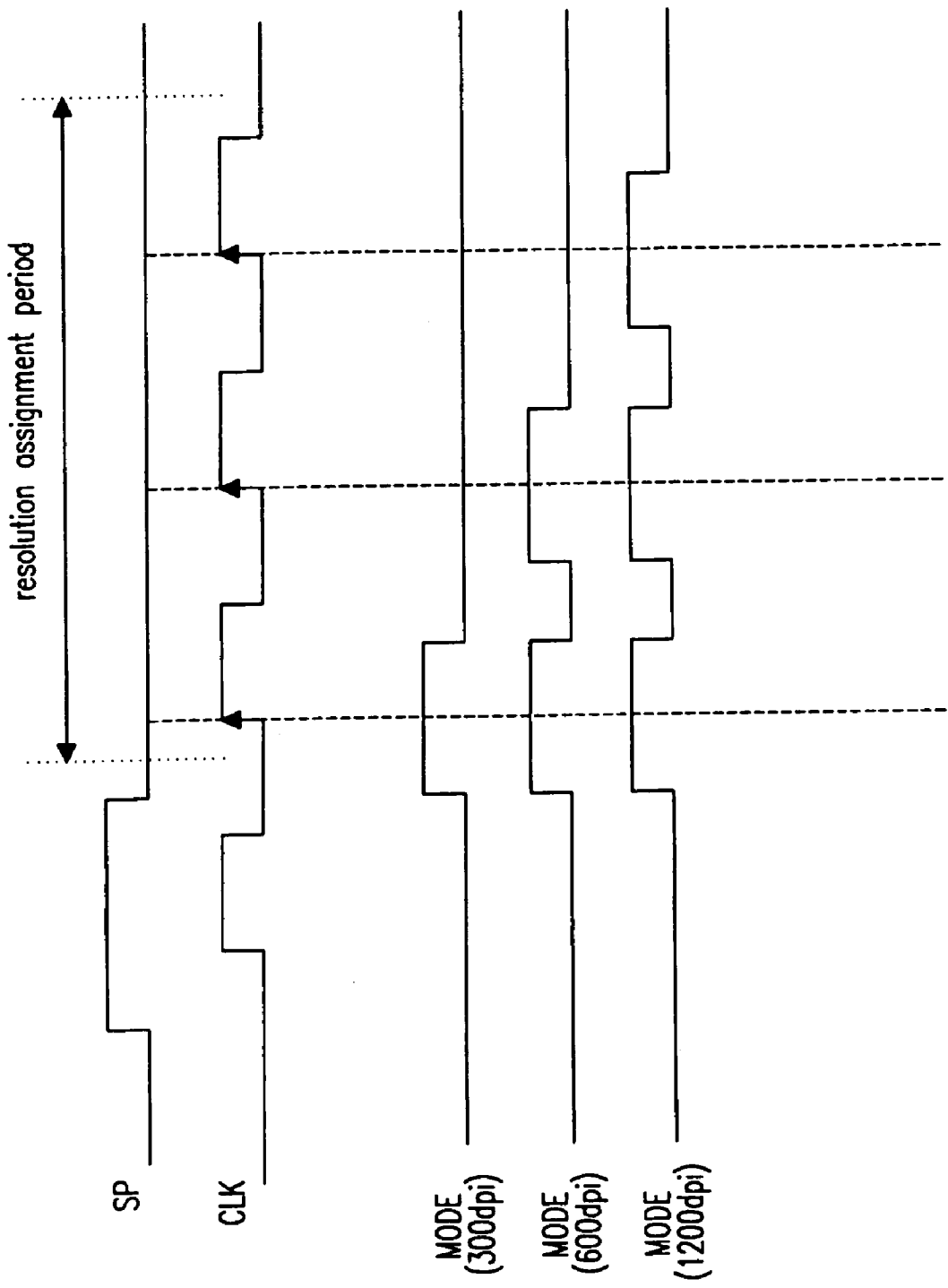
FIG. 10 is a timing diagram showing the resolution setting according to the fourth embodiment of the invention.

In the third embodiment shown in FIG. 9, the mode signal MODE can be also latched synchronizing with the falling edge of the clock pulse signal CLK. In the fourth embodiment shown in FIG. 10, when the mode signals MODE latched synchronizing with the rising edge of the clock pulse signal CLK are "H", "L", "L" respectively, the resolution is assigned to 300 dpi. Further, "H", "H", "L" is assigned to 600 dpi, and "H", "H", "H" is assigned to 1200 dpi. This assignment can achieve following effects. In this case, the resolution can be affirmatively determined as 300 dpi at the time point of when the first one is "H" and the second one is "L". Therefore, immediately after the mode switching period has ended, the flip flops (F/F) 37 can be activated to instantly start reading images. However, since the timing for the resolution setting according to the clock pulse signal CLK is three times, the fourth embodiment is described with three kinds of resolutions.

If the mode switching period can also be interrupted at an early stage for a lower resolution as described in the fourth embodiment, the effect can be more obvious. Namely, when the resolution is set lower, a quick output of the image signal more than a lucidity of the read image is desired for the user. Therefore, if the resolution can be affirmatively determined at the early stage of the mode switching period, user's demands can be further satisfied.

In addition, the resolution setting of the above embodiments can be performed for each job in reading image, or performed only once for one page. The output control unit 23 is controlled at the same resolution in the reading job for the prior case or in reading one page for the latter case.

Figure 11:
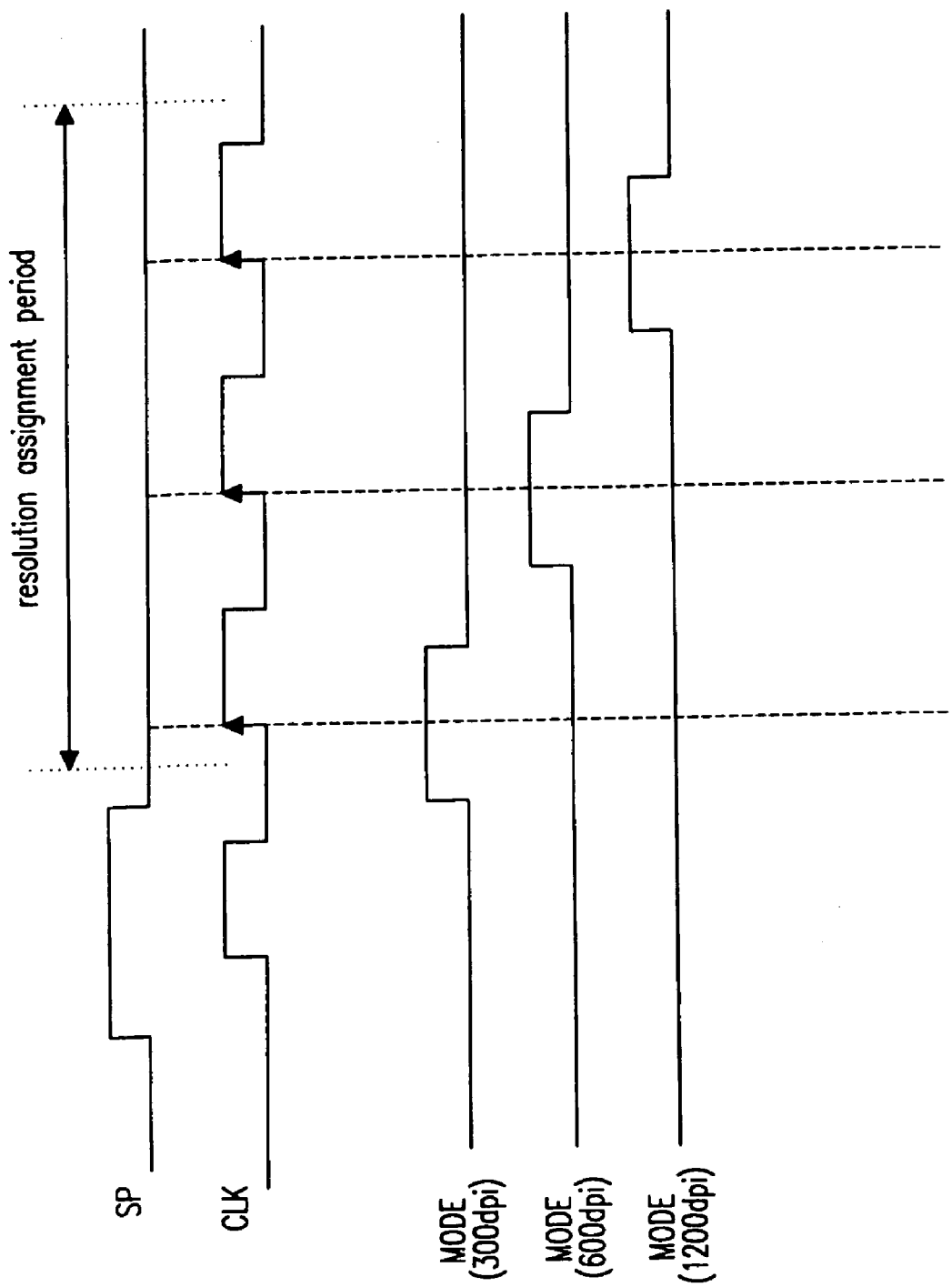
FIG. 11 is a diagram showing the resolution setting according to the fifth embodiment of the invention.

In the fifth embodiment shown in FIG. 11, when the mode signals MODE latched synchronizing with the rising edge of the clock pulse signal CLK are "H", "L", "L" respectively, the resolution is assigned to 300 dpi. Further, "L", "H", "L" is assigned to 600 dpi, and "L", "L", "H" is assigned to 1200 dpi. In this case, the mode switching period can also be interrupted at an early stage for a lower resolution. Similar to the fourth embodiment, the fourth embodiment is also described with three kinds of resolutions.

Figure 12:
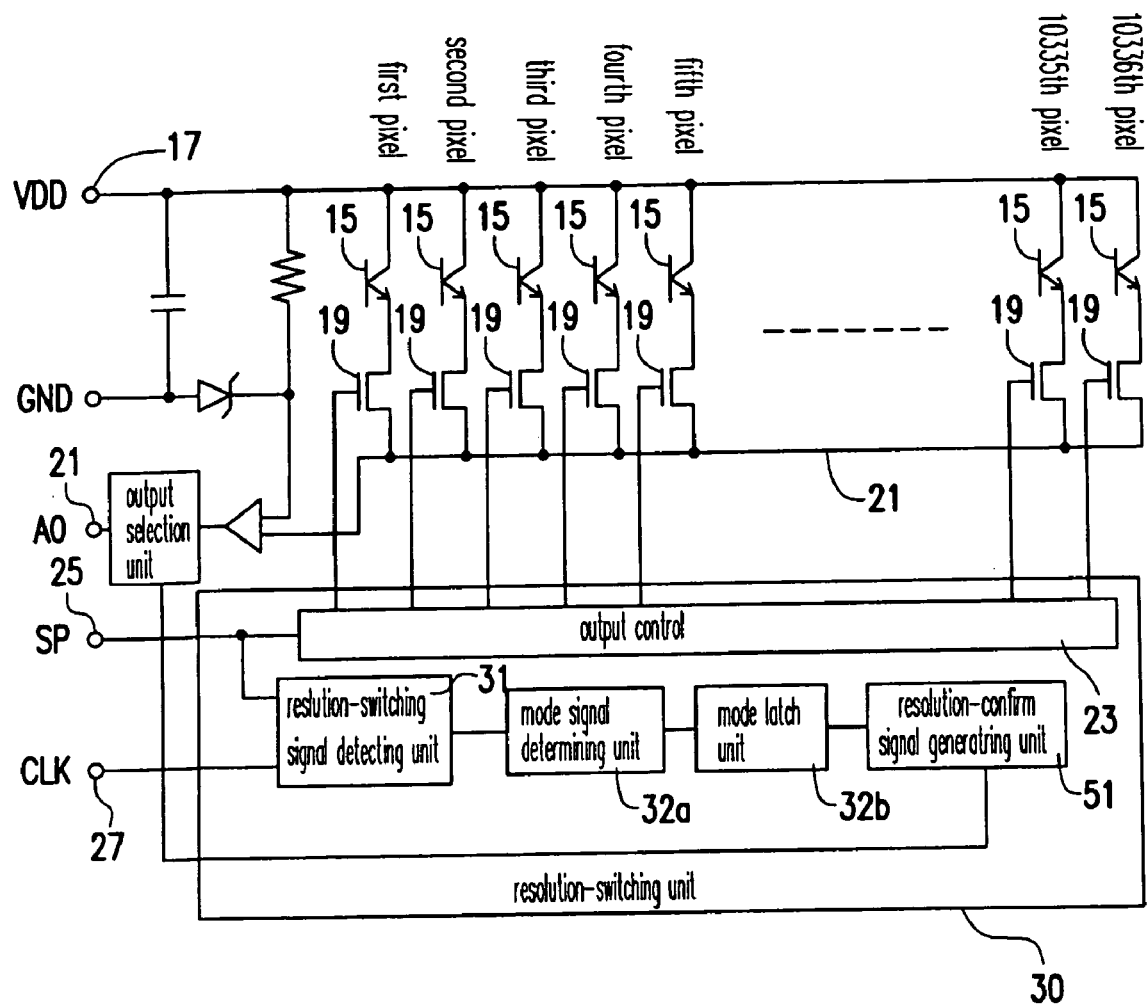
FIG. 12 shows a structure of an image device according to the sixth embodiment of the invention.
Figure 12:
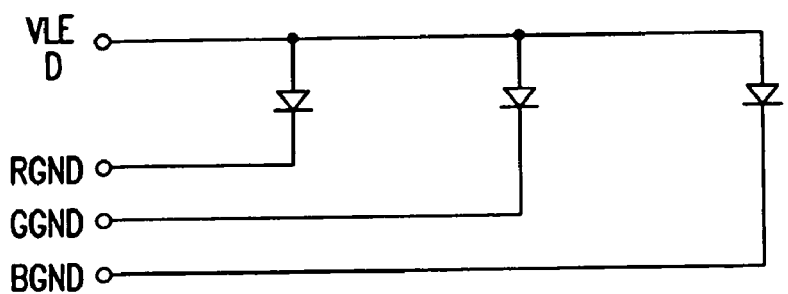
Figure 13:
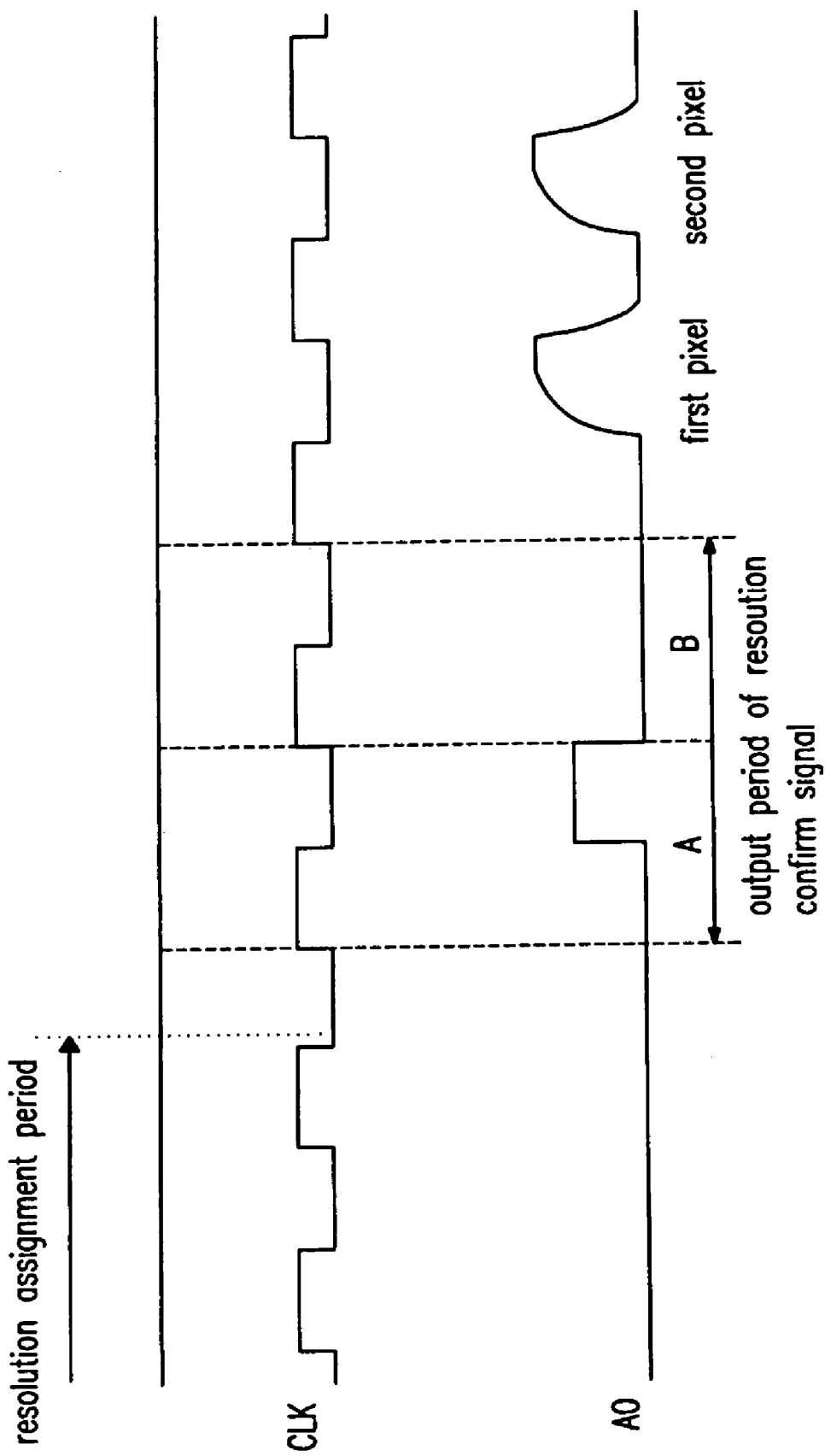
FIG. 13 is a timing diagram showing a resolution-confirm signal according to a sixth embodiment of the invention.
Figure 14:
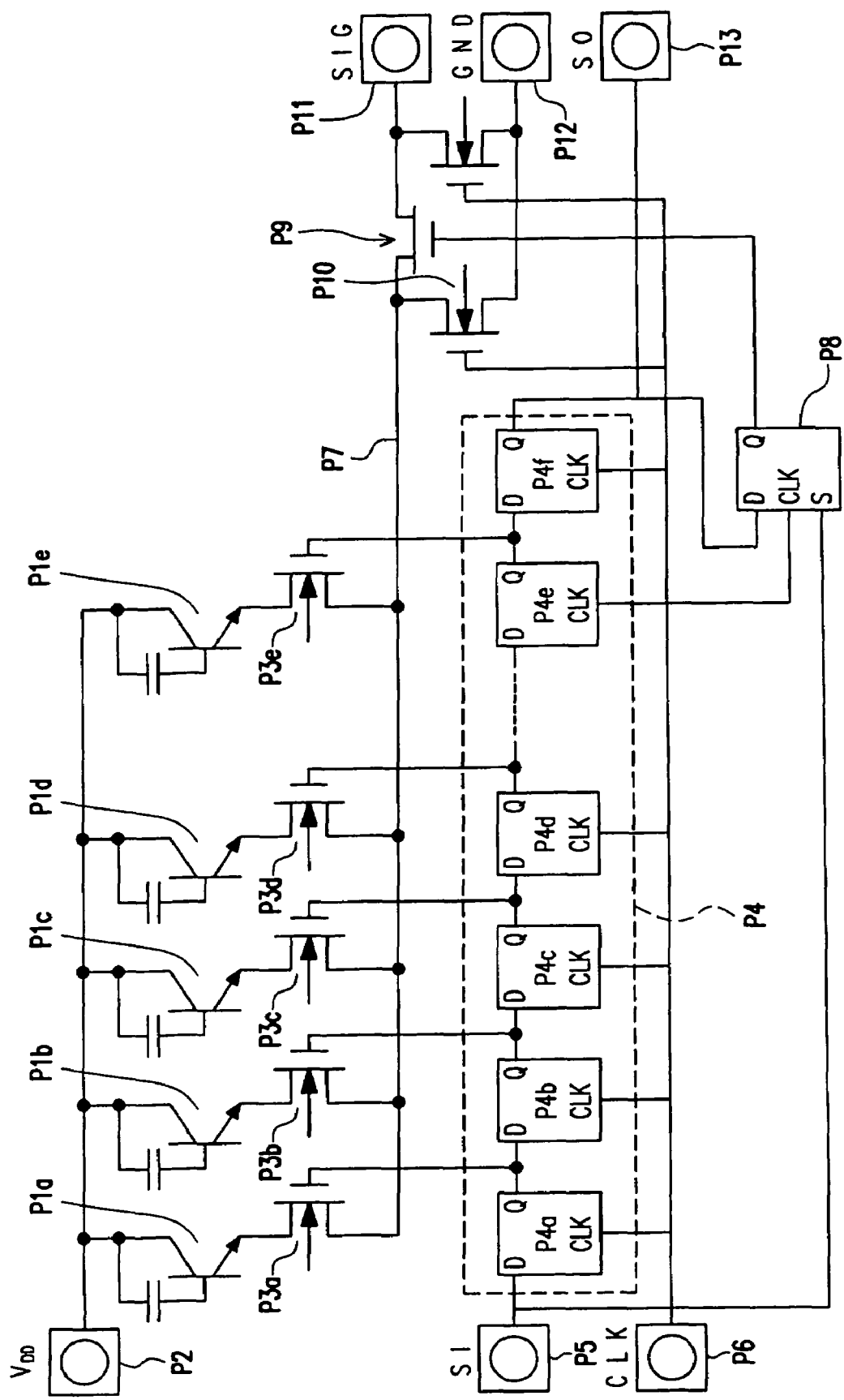
FIG. 14 shows a structure of a conventional image sensor.

FIGS. 12 and 13 show a block diagram and a timing diagram according to the sixth embodiment of the present invention. Further, in the sixth embodiment, the aforementioned first to fifth embodiments can be suitably combined. As shown in FIG. 12, in addition to the structure shown in FIG. 4, a resolution-confirm signal generating unit 51 is further arranged in the resolution-switching unit 30 according to the sixth embodiment. Further, an output selection unit 53 is also included, so that either the output of the resolution-confirm signal generating unit 51 or the charge release from the photoelectric converting elements 15 is selectively output to the AO terminal 21.

When the resolution is determined in the aforementioned manner and the resolution-switching control signal generating unit 32 outputs the resolution-switching control signal to the output control unit 23, the resolution-confirm signal generating unit 51 generates a resolution-confirm signal (a resolution signal) according to the resolution-switching control signal. As shown in FIG. 13, the resolution-confirm signal is output as a two-bit signal A, B at a resolution-confirm signal output period that is set from the end of the mode switching period to the output of the image signal. The correspondence between the values A, B and the resolution is defined in TABLE 2.

TABLE 2

| A | B | resolution |
|---|---|------------|
| L | L | 1200 dpi |
| H | L | 600 dpi |
| L | H | 300 dpi |
| H | H | 150 dpi |

In the embodiment, the CPU 13 of the ASIC 5 can determine whether the assigned resolution is correctly set to the image device 3 by reading the resolution-confirm signal. When the resolution-confirm signal shows a difference with the assigned resolution, a warning is asserted, the image reading is interrupted, and the resolution can be reset.

In the aforementioned embodiments, the resolution-switching signal detecting unit 31 and the resolution-switching control signal generating unit 32 are equivalent to resolution setting means. In addition, the present invention is not limited to the embodiment described above, can be implemented with various modifications under the scope of the invention.

For example, in the aforementioned embodiments, the mode signal MODE is read synchronizing with the clock pulse signal CLK in the mode switching period, but the resolution can be also determined by inputting pulse-shaped mode signals that are not synchronized with the clock pulse signal CLK and then counting the pulse number using a counter, etc. However, when the mode signal MODE is read synchronizing with the clock pulse signal CLK, the process becomes easier. Moreover, generating the start signal SP in the mode switching period can be used to replace the mode signal MODE, or the mode signal MODE can be read synchronizing with the start signal SP generated in the mode switching period. However, when the start signal SP for the resolution setting is generated in the mode switching period, it is necessary to generate the start signal SP again for activating the output control unit 23.

Furthermore, in the above embodiments, when the resolution other than the maximum resolution (1200 dpi) is set, a plurality of the analog switches is turned on at the same time. But, the analog switches 19 to be turned on can be also alternatively turned on to reduce the resolution. However, in the aforementioned embodiments, since a plurality of the analog switches 19 corresponding to the resolution is turned on at the same time, the electrical signals output from the plural photoelectric converting elements 15 are simultaneously transmitted to the signal line. Therefore, when the resolution other than the maximum resolution (1200 dpi) is set, the cycle of the reception of the optical signals and the output of the electric signals of the photoelectric converting elements 15 is shortened. Even though the electric signal for each photoelectric converting element 15 is small, the output on the signal line is not rendered small, so that a high S/N (signal-to-noise) ratio of the read image can be maintained.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. An image sensor, comprising:
   a plurality of photoelectric converting elements, for converting optical signals to electric signals;
   a group of channel select switches, each channel select switch arranged between a charge output unit corresponding to one of the plurality of photoelectric converting elements and a signal line common to the plurality of photoelectric converting elements, wherein the group of the channel select switches can be turned on and off sequentially synchronizing with an externally supplied clock pulse signal; and
   resolution setting means, including:
      a first input terminal configured to input a resolution assignment signal from an outside of the image sensor;
      a second input terminal that inputs a resolution assignment timing signal from the outside of the image sensor; and
      a third input terminal that inputs a resolution assignment period setting signal from the outside of the image sensor;
      wherein the resolution setting means sets an on-off control pattern for the group of the channel select switches according to an on-off pattern of the resolution assignment signal, which is input through the first input terminal, at a plurality of timings set by the resolution assignment timing signal, which is input through the second input terminal, in a resolution assignment period set according to the resolution assignment period setting signal input through the third input terminal, and the resolution assignment period is set as a prescribed period after the resolution assignment period setting signal is turned off.

2. The image sensor of claim 1, further comprising a group of shift registers for determining the on-off control pattern of the group of the channel select switches, wherein the group of the shift registers determines the on-off control pattern according to the resolution set by resolution setting means.

3. The image sensor of claim 2, wherein the resolution assignment signal, the resolution assignment timing signal and the resolution assignment period setting signal respectively correspond to a control signal, a start signal for activating the group of shift registers and the clock pulse signal which are respectively input from an external device.

4. The image sensor of claim 3, wherein when the start signal is the resolution assignment period setting signal, an on-off control of the group of the shift registers is initiated after the resolution assignment period.

5. The image sensor of claim 3, wherein the resolution assignment timing signal is the clock pulse signal.

6. The image sensor of claim 3, wherein the resolution assignment period is randomly determined by a software setting.

7. The image sensor of claim 2, wherein when a resolution other than a maximum resolution is set by resolution setting means, the group of the shift registers simultaneously turns on the plural channel select switches corresponding to the set resolution.

8. The image sensor of claim 1, wherein the on-off pattern of the resolution assignment signal at the timings set by the resolution assignment timing signal is set as binary data, and the resolution set by the resolution setting means is performed by binary data or an "on" number in the on-off pattern.

9. The image sensor of claim 1, wherein when the resolution to be set is determined in the middle of the resolution assignment period, the resolution assignment period is immediately terminated.

10. The image sensor of claim 9, wherein when the resolution to be set is not the maximum resolution among settable resolutions, the resolution to be set is determined in the middle of the resolution assignment period.

11. The image sensor of claim 10, wherein a lower resolution among the settable resolutions is determined at an early stage of the resolution assignment period.

12. The image sensor of claim 1, wherein a lower resolution is obtained by turning on a greater number of the channel select switches simultaneously.

13. An image sensor, comprising:
   a plurality of photoelectric converting elements, for converting optical signals to electric signals;
   a group of channel select switches, each channel select switch arranged between a charge output unit corresponding to one of the plurality of photoelectric converting elements and a signal line common to the plurality of photoelectric converting elements, wherein the group of the channel select switches can be sequentially turned on and off synchronizing with an externally supplied clock pulse signal; and
   resolution setting means, including:
      a first input terminal configured to input a resolution assignment signal from an outside of the image sensor;
      a second input terminal that inputs a resolution assignment timing signal from the outside of the image sensor; and
      a third input terminal that inputs a resolution assignment period setting signal from the outside of the image sensor;
      wherein the resolution setting means sets an on-off control pattern for the group of the channel select switches according to an assigned timing in a resolution assignment period set according to the resolution assignment period setting signal, which is input through the third input terminal, and the resolution assignment period is set as a prescribed period after the resolution assignment period setting signal is turned off.

14. The image sensor of claim 13, wherein a lower resolution is obtained by turning on a greater number of the channel select switches simultaneously.

15. A reading device, comprising:
an image sensor, comprising:
   a plurality of photoelectric converting elements, for converting optical signals to electric signals;
   a group of channel select switches, each channel select switch arranged between a charge output unit corresponding to one of the plurality of the channel select switches and a signal line common to the plurality of photoelectric converting elements, wherein the group of the channel select switches can be turned on and off sequentially synchronizing with an externally supplied clock pulse signal, and
resolution setting means, including:
   a first input terminal configured to input a resolution assignment signal from an outside of the image sensor;
   a second input terminal that inputs a resolution assignment timing signal from the outside of the image sensor; and
   a third input terminal that inputs a resolution assignment period setting signal from the outside of the image sensor;
   wherein the resolution setting means sets an on-off control pattern for the group of the channel select switches according to an on-off pattern of the resolution assignment signal, which is input through the first input terminal, at a plurality of timings set by the resolution assignment timing signal, which is input through the second input terminal, in a resolution assignment period set according to the resolution assignment period setting signal input through the third input terminal;
resolution assignment signal generating means, for generating the resolution assignment signal;
resolution assignment timing signal generating means, for generating the resolution assignment timing signal;
resolution assignment period setting means, for generating the resolution assignment period setting signal; and
control means, for controlling the resolution assignment signal generating means, the resolution assignment timing signal generating means and the resolution assignment period setting means according to a read;
wherein the image sensor further comprises a group of shift registers for determining the on-off control pattern of the group of the channel select switches, and the resolution assignment signal, the resolution assignment timing signal and the resolution assignment period setting signal respectively correspond to a control signal, a start signal for activating the group of the shift register and the clock pulse signal which are respectively input from an external device, and in a resolution assignment period that is set as a prescribed period after the start signal is turned off, the control means sets a resolution using an on-off pattern of the control signal at a plurality of timings set by the clock pulse signal.

16. The reading device of claim 15, wherein when a resolution other than a maximum resolution is set by resolution setting means, the group of the shift registers simultaneously turns on the plural channel select switches corresponding to the set resolution.

17. The reading device of claim 15, wherein when a resolution is changed each time, a resolution signal for indicating the resolution is included in an image signal that is output from the image sensor.

18. The reading device of claim 15, wherein a lower resolution is obtained by turning on a greater number of the channel select switches simultaneously.

19. A method for setting a resolution of an image sensor, the image sensor comprising a plurality of photoelectric converting elements for converting optical signals to electric signals; a group of channel select switches, each channel select switch arranged between a charge output unit corresponding to one of the plurality of photoelectric converting elements and a common signal line corresponding to the plurality of photoelectric converting elements, wherein the group of the channel select switches can be turned on and off sequentially synchronizing with an externally supplied clock pulse signal, the method comprising:
   when a resolution assignment signal, a resolution assignment timing signal and a resolution assignment period setting signal are input, setting an on-off control pattern for the group of the channel select switches according to an on-off pattern of the resolution assignment signal at a plurality of timings set by the resolution assignment timing signal, in a resolution assignment period that is set based on the resolution assignment period setting signal;
   wherein the resolution assignment period is set as a prescribed period after the resolution assignment period setting signal is turned off.

20. The method of claim 19, wherein the resolution assignment signal, the resolution assignment timing signal and the resolution assignment period setting signal respectively correspond to a control signal, a start signal for activating a group of shift registers and the clock pulse signal which are respectively input from an external device.

21. The method of claim 19, wherein a lower resolution is obtained by turning on a greater number of the channel select switches simultaneously.

* * * * *